UNITED STATES PATENT OFFICE 2,516,560

N-DIMETHYLAMINOETHYL-N-ALKOXY-ETHYL (OR BENZYLOXYETHYL)-ANILINES

Paul Gailliot and Francois Custot, Paris, France, assignors to Societe des Usines Chimiques Rhone Poulenc, Paris, France, a French body corporate No Drawing. Application June 26, 1946, Serial No. 679,582. In France January 14, 1944

Section 1, Public Law 690, August 8, 1946
Patent expires January 14, 1964

4 Claims. (Cl. 260—570.5)

This invention concerns substituted ethylene diamines and processes for producing the same and has for its main object to provide new compounds of the aforesaid type which possess valuable therapeutic properties.

The new compounds of the present invention conform to the general formula:

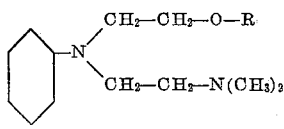

in which R represents a member of the class consisting of lower alkyl and benzyl groups. These compounds may be prepared by the condensation of an ω-alkoxy- or ω-aralkoxy-ethyl-aniline with a β-dimethyl-amino-α-halogenoethane or by the condensation of N-phenyl-N':N'-dimethyl-ethylenediamine with an alkylated or aralkylated ether of a halohydrin of ethylene glycol.

In the following non-limitative examples there are disclosed the preparation of representative compounds of the present invention.

Example I

During three-quarters of an hour there are poured into 86 g. of N - ethoxy - ethylaniline brought to 140° C., 28 g. of dimethylaminochlorethane dissolved in ether (the ether gradually distilling off).

Heating is continued for another quarter of an hour; the mass obtained is treated with water and excess caustic soda, then extracted with ether. From the ether extract, the ether is driven off and the product distilled. There is thus obtained 22 g. of N-dimethylaminoethyl-N-ethoxyethyl-aniline boiling at 132-136° C. under 4.5 mm. pressure. Its monohydrochloride, recrystallised from ethyl alcohol, melts at 131° C.

Example II 17 g. of N-dimethylaminoethyl-aniline are heated to 150° C. for two hours with 52 g. of benzyloxy - ethyl chloride. The N - dimethyl-aminoethyl - N - benzyloxyethyl-aniline obtained boils at 209-212° C. under 12 mm. pressure.

Example III 50 g. of N-dimethylaminoethyl-aniline are agitated with 13 g. of sodamide (85%), then 44 g. of the methyl ether of ethylene glycol bromhydrin are poured in drop by drop, keeping the temperature below 40° C. At the end of the reaction, the product is heated for half an hour to 100° C. The heating is then stopped but agitation is continued for an hour. The product is treated with water, extracted with ether, and the ethereal extract is heated to drive off the ether and rectification is effected in vacuo. There is thus obtained N-dimethylaminoethyl-N-β-methoxyethyl-aniline, which boils at 133-139° C. under 4 mm. pressure and of which the hydrochloride melts at 122° C.

Example IV 75 g. of N-β-methoxyethyl-aniline are heated for 5 hours to 125° C. with 39 g. of dimethylaminochlorethane hydrochloride. The product is treated with water and neutralised (bromcresol green) by means of caustic soda lye. The neutral products are extracted with ether. The aqueous portion is rendered definitely basic to phenolphthalein by means of caustic soda, and the bases are extracted by ether. After drying over anhydrous potassium carbonate, the ether is driven off from the ether extract and the extract then distilled. There is thus obtained the N-dimethylaminoethyl - N - methoxyethyl-aniline already described in Example III.

We claim:

1. New therapeutically active substituted ethylene diamines being members of the class consisting of compounds of the general formula

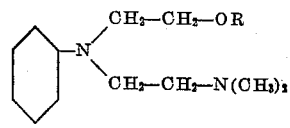

wherein R represents a radical selected from the class consisting of lower alkyl and benzyl groups.

2. A new chemical compound, being N-dimethylaminoethyl-N-ethoxyethyl-aniline.

3. A new chemical compound, being N-dimethylaminoethyl-N-benzyloxyethyl-aniline.

4. A new chemical compound, being N-dimethylaminoethyl-N-methoxyethyl-aniline.

PAUL GAILLIOT.
FRANCOIS CUSTOT.

REFERENCES CITED

The following references are of record in the file of this patent:

UNITED STATES PATENTS

| Number | Name | Date |
|---|---|---|
| 2,381,071 | McNally et al. | Aug. 7, 1945 |

FOREIGN PATENTS

| Number | Country | Date |
|---|---|---|
| 758,079 | France | Jan. 10, 1934 |

OTHER REFERENCES

Groggins, "Aniline and Its Derivatives," published by D. Van Nostrand Company (1924 Ed.), pages 182-183.